(12) United States Patent  (10) Patent No.: US 6,363,774 B2
Duff  (45) Date of Patent: Apr. 2, 2002

(54) METHOD AND APPARATUS FOR BRAKE LEAK DETECTION

(75) Inventor: Douglas J. Duff, Marysville, OH (US)

(73) Assignee: Honda of America, Manufacturing, Inc., Marysville, OH (US)

( * ) Notice: Subject to any disclaimer, the term of this patent is extended or adjusted under 35 U.S.C. 154(b) by 0 days.

(21) Appl. No.: 09/767,309

(22) Filed: Jan. 23, 2001

Related U.S. Application Data

(63) Continuation-in-part of application No. 09/248,474, filed on Feb. 11, 1999, now abandoned.

(51) Int. Cl.[7] .................. G01L 5/28; B25B 25/00; G01M 3/28
(52) U.S. Cl. .............. 73/40; 73/121; 73/129; 73/132; 340/605
(58) Field of Search .................. 73/40, 121, 129, 73/132, 128; 340/605

(56) References Cited

U.S. PATENT DOCUMENTS

| | | | | |
|---|---|---|---|---|
| 3,031,884 A | * | 5/1962 | Martin | 73/40 |
| 4,114,430 A | * | 9/1978 | Luepertz et al. | 73/121 |
| 4,307,604 A | * | 12/1981 | Domitter | 73/121 |
| 4,603,576 A | * | 8/1986 | Spencer | 73/40 |
| 5,131,268 A | * | 7/1992 | Dillmann | 73/121 |
| 5,181,440 A | * | 1/1993 | Jagt | 81/484 |
| 5,705,744 A | * | 1/1998 | Brugger et al. | 73/121 |
| 6,094,977 A | * | 8/2000 | Vaughn | 73/121 |
| 6,105,422 A | * | 8/2000 | Pollock et al. | 73/121 |
| 6,230,549 B1 | * | 5/2001 | Harris | 73/49.7 |
| 6,327,895 B1 | * | 12/2001 | Jeppsson et al. | 73/40 |

* cited by examiner

Primary Examiner—Hezron Williams
Assistant Examiner—David J. Wiggins
(74) Attorney, Agent, or Firm—Barbara Joan Haushalter; Allan T. McDonald

(57) ABSTRACT

A vehicle brake leakage detector installs between a vehicle brake pedal and a reference point such as a steering wheel, for testing vehicle hydraulic brake systems, and, specifically, for detecting brake fluid leaks. A brake contact at one end of the detector contacts the vehicle brake pedal and a reference end at the opposite end of the detector contacts any tangible reference location, such as a steering wheel. Force means are associated with the detector for applying force for pressurizing the vehicle brake fluid when the detector is installed. A sensor detects relative movement between the brake contact and reference end to determine whether any brake fluid leaks are present. An output source indicates whether any brake fluid leaks are detected.

13 Claims, 4 Drawing Sheets

| TRIAL | FLUID DRAINED FROM EACH WHEEL BEFORE IT WAS DETECTED | | | | | | | |
|---|---|---|---|---|---|---|---|---|
| | LEFT FRONT | | RIGHT FRONT | | LEFT REAR | | RIGHT REAR | |
| | DROPS | CC | DROPS | CC | DROPS | CC | DROPS | CC |
| 1 | 0.5 | 0.2 | 1.0 | 0.4 | 1.0 | 0.4 | 1.5 | 0.6 |
| 2 | 0.5 | 0.2 | 1.5 | 0.6 | 1.0 | 0.4 | 1.0 | 0.4 |
| 3 | 0.5 | 0.2 | 1.0 | 0.4 | 0.5 | 0.2 | 1.0 | 0.4 |
| 4 | 0.5 | 0.2 | 1.0 | 0.4 | 1.0 | 0.4 | 1.0 | 0.4 |
| 5 | 0.5 | 0.2 | 1.0 | 0.4 | 1.0 | 0.4 | 2.0 | 0.8 |
| 6 | 1.0 | 0.4 | 1.0 | 0.4 | 1.0 | 0.4 | 1.0 | 0.4 |
| 7 | 1.0 | 0.4 | 1.0 | 0.4 | 1.0 | 0.4 | 1.0 | 0.4 |
| 8 | 0.5 | 0.2 | 1.0 | 0.4 | 1.0 | 0.4 | 1.5 | 0.6 |
| 9 | 0.5 | 0.2 | 1.0 | 0.4 | 1.0 | 0.4 | 1.5 | 0.6 |
| 10 | 0.5 | 0.2 | 1.0 | 0.4 | 1.0 | 0.4 | 1.5 | 0.6 |

METHOD AND APPARATUS FOR BRAKE LEAK DETECTION

CROSS-REFERENCE TO RELATED APPLICATIONS

This is a continuation-in-part of U.S. application Ser. No. 09/248,474, filed Feb. 11, 1999 now abandoned.

FIELD OF THE INVENTION

This invention relates generally to an apparatus for leakage testing fluid systems, and more particularly to an arrangement and method for testing vehicle hydraulic brake systems.

BACKGROUND OF THE INVENTION

When servicing vehicles in the field, it is very important to give the customer quick and thorough service. Quicker service is desirable for several reasons, such as that it tends to result in less expense for the service, as well as being more convenient for the customer.

In certain instances, however, quick service can be more difficult, such as when servicing a brake issue. Knowing how important brakes are to the performance of the vehicle, inspections can be very time consuming in the effort to guarantee that the brakes are in peak operating condition. Of course, many brake component inspections are straightforward and can be performed quickly by the technician, such as a pad thickness check, a disc thickness inspection, etc. However, confirming that a system has no brake fluid leaks can be very time consuming. Some parts of the vehicle must be disassembled and other parts are difficult to see and reach. Even when the brake components are easily accessible, it still takes time to check the numerous pipe, hose, and banjo fitting connections.

It is seen, therefore, that it would be desirable to have a device for easily detecting fluid leaks. Besides being a time saving device at the service end, such a tool could also be useful at the manufacturing facility for quality checks.

Therefore, among the purposes of this invention is the provision of brake leak detection capable of testing the condition of brake fluid loss.

Also a purpose of this invention is the capability of providing an accurate and straightforward leakage determination which can be easily and reliably installed.

SUMMARY OF THE INVENTION

These purposes are achieved by the brake leak detection system and method according to the present invention, wherein the condition of the brake fluid lines can be determined before a vehicle leaves the manufacturing facility.

In accordance with one embodiment of the present invention, a vehicle brake leakage testing system can be easily mounted in association with and removed from the vehicle brake pedal. The brake leakage testing system comprises a brake leak detector assembly having at least a brake contact, a spring means, an output means, and a reference end, typically opposite the brake contact.

The primary advantage provided by the present invention is to detect vehicle brake fluid leaks. Even an infinitesimal fluid loss can be detected at the factory, rather than after delivery to a customer. Furthermore, the brake leak detector is easy to install and can accurately determine if any brake fluid leaks are present on a vehicle in a matter of minutes.

Other objects and advantages of the invention will be apparent from the following description, the accompanying drawings and the appended claims, to which reference may be had for a full understanding of the nature of the present invention.

DESCRIPTION OF THE PREFERRED EMBODIMENT

In accordance with the present invention, a vehicle brake leakage testing system can be easily mounted in association with and removed from the vehicle brake pedal. The brake leakage testing system comprises a brake leak detector assembly having at least a brake contact, a sensor, a force applying means, an output means, and a reference end, typically opposite the brake contact.

When the brake contact is in contact with the vehicle brake pedal, the reference end is located at any tangible reference location, such as in contact with the steering wheel of the vehicle. The brake pedal of the vehicle is depressed so as to securely wedge the brake leak detector assembly between the brake pedal and the tangible reference location, and encourage the spring means to apply the necessary force for pressurizing the brake fluid. The sensor is used to detect any leaks in the brake fluid line and the output means then indicates whether any leaks are detected in the brake fluid line. The device of the present invention is used when the vehicle is not running. There is electrical power to power the device as the vehicle is in an auxiliary mode.

Figure 1:
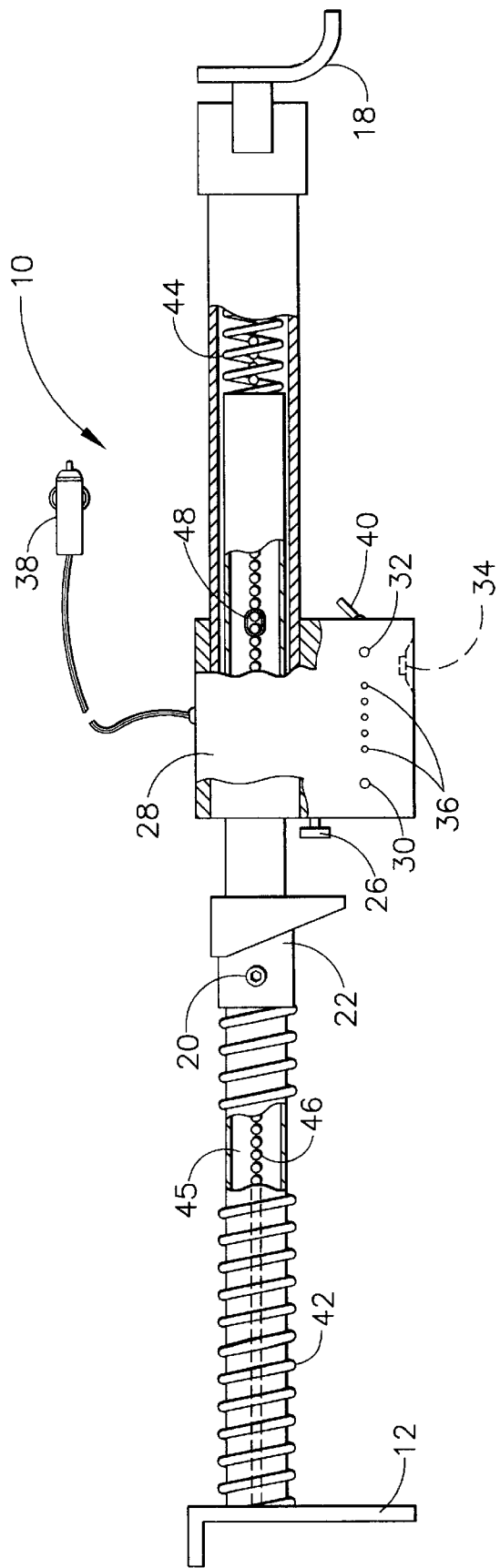
FIG. 1 is a side view illustrating the vehicle brake leakage testing system in accordance with the present invention.
Figure 2:
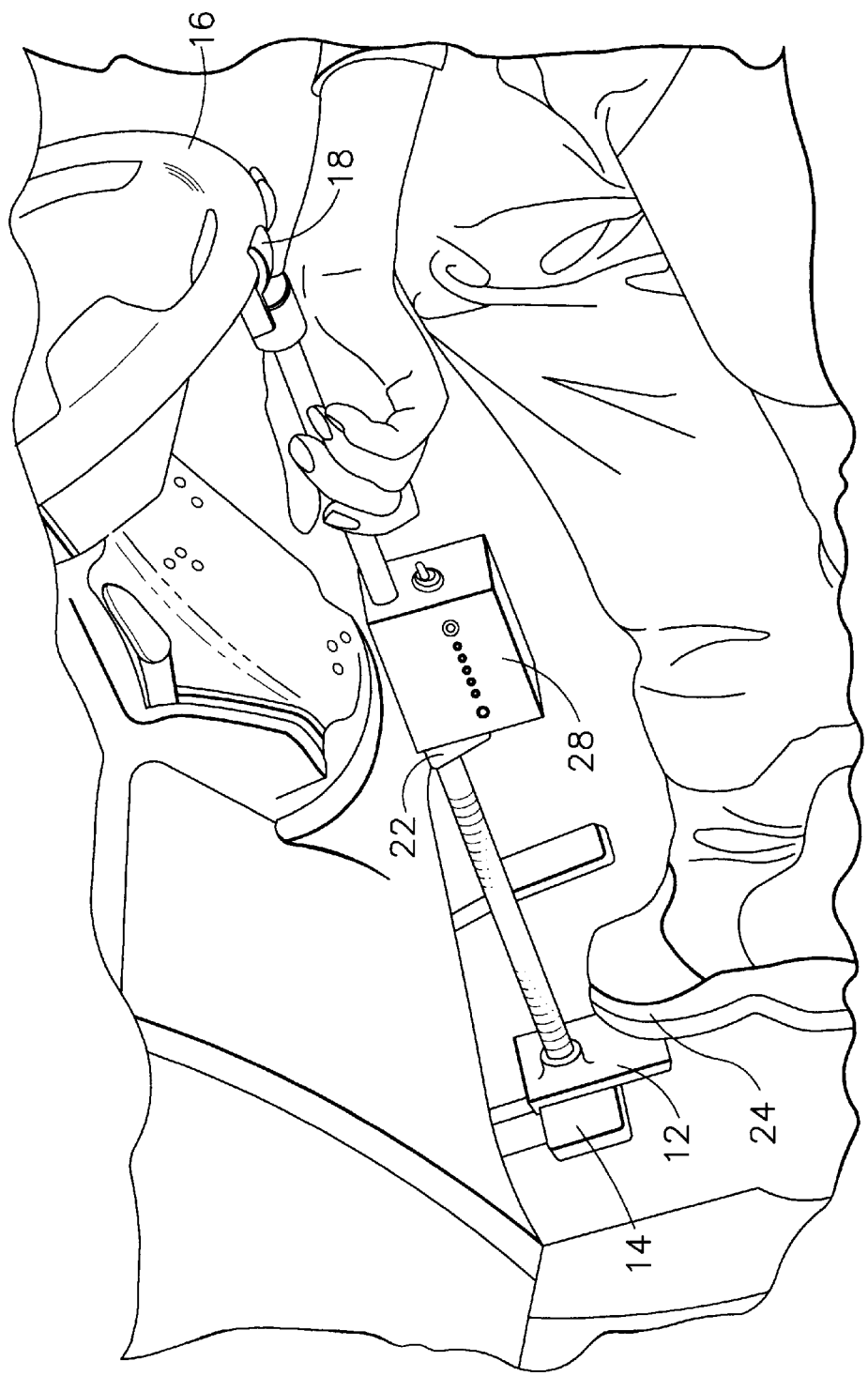
FIG. 2 illustrates the vehicle brake leakage testing system of FIG. 1 in operation.

Referring to the drawings, FIG. 1 illustrates a brake leak detector assembly 10, in accordance with the present invention. In FIG. 1, a brake contact 12, comprises a foot/brake pedal bracket. The brake contact 12 is positioned so as to wedge the assembly 10 between the brake pedal 14 (at the brake contact 12 end) and a reference location (such as steering wheel 16) at reference end 18, as illustrated in FIG. 2.

Initially, a set screw 20 associated with a sliding collar 22 is loosened. The operator then sits in the driver's seat of the stationary vehicle and confirms that the steering wheel is straight and in the correct tilt position, before starting the vehicle. The brake leak detector pedal plate 12 is placed between the brake pedal 14 and the operators foot 24. The operator then confirms that the reference end 18 is properly positioned and the sliding collar 22 is correctly oriented. The engine is then turned off and the vehicle is placed in an auxiliary mode to provide electrical power to the assembly 10. In a preferred embodiment of the present invention, the correct orientation for the sliding collar 22 requires the sliding collar to make contact with sensor 26, associated with circuit box 28, illustrated in more detail in FIG. 3.

To correctly locate the reference end 18, in a preferred embodiment of the invention, the operator depresses the brake pedal 14 while pushing downward, into the brake pedal, on the assembly 10, facilitated by force application means, such as springs 42 and 44, or other such means, such as a screw assembly. Chain 46 and associated swivel location 48 can be used to hold the device together when the unit is not installed. This securely positions the assembly 10 between the pedal 14 and the steering wheel 16 (or other reference location). As stated, the sliding collar 22 should abut circuit box 28, as sensed by sensor 26 and indicated by contact indicator 30.

To measure a leak in the brake system, the system is initialized. The set screw 20 is adjusted so that spring 42 displaces sliding collar 22 against sensor 26, thereby activating the sensor 26. With set screw 20 loosened, brake pedal 12 can be depressed and locked to the reference end 18 and steering wheel 16. This establishes a relative position. At this point, the spring 42 has set or defined the collar 22 against sensor 26, so that collar 22 is in contact with sensor 26 and set screw 20 is tightened. Now spring 44 exerts a pressure to push rod 45 associated with brake pedal 12, maintaining the tension to push and keep pedal 12 down.

Continuing with FIG. 1, if there is a brake fluid leak, the pressure on rod 45 to depress pedal 12 moves the collar 22 away from contact with sensor 26. An associated computer or means such as circuit box 28 for outputting the brake fluid leak detection results reads this result as a brake fluid leak. If there is a brake fluid leak, the pedal 12 will depress, and this relative motion of the brake pedal is detected by the sensor 26 which loses contact with the collar 22. If there is no brake fluid leak, rod 45 and brake pedal 12 will not move, and collar 22 will maintain contact with sensor 26. The output computer reads this result as no brake fluid leaks.

EXAMPLE

Figures 4A, 4B:
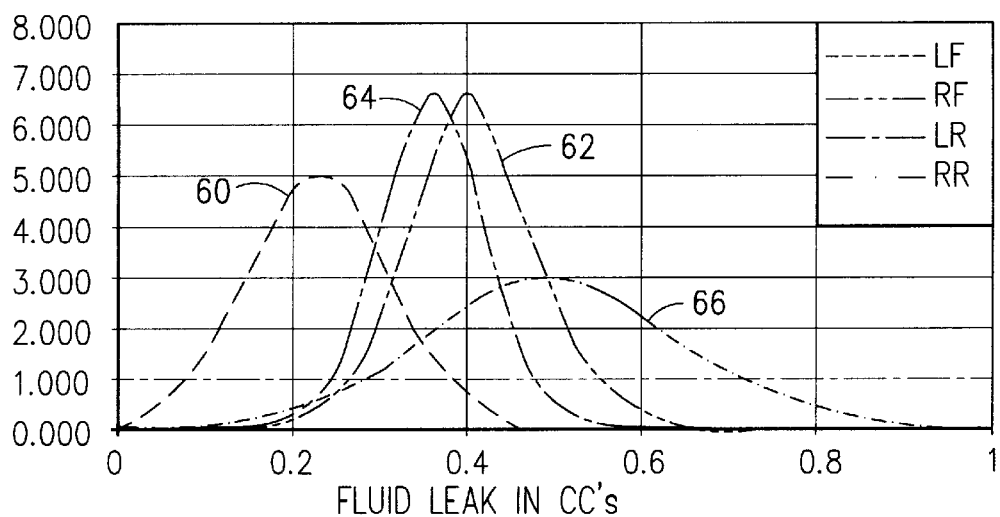
FIGS. 4A and 4B show a table of test data results and the graphical representation of fluid leaks, respectively.

The brake leak detector of the present invention was utilized on a 1999 Honda Civic Si. The vehicle was raised in the air and supported on jack stands, and all four wheels were removed. The following steps were then performed on each of the four wheels. First, a two inch hose on the left front caliper bleed screw was installed. The bleed screw was opened to fill the hose with fluid. The vehicle was then started, the brake leak detector of the present invention was properly installed, and the engine shut off and the vehicle placed in an auxiliary mode. The steering wheel was then lowered to its lowest tilt position, and the brake leak detector power cord was plugged into the 12 volt outlet of the vehicle. The sliding collar was positioned up on the shaft, as discussed above in reference to FIG. 1, thereby activating the sensor 26 and turning the test system on. A wrench was then placed on the left front bleed screw and slowly opened, releasing measured amounts of fluid, as indicated in the table of FIG. 4A. The number of drops released from the end of the hose before detection of the leak by the brake leak detector were counted. After detection of the leak, the bleed screw was closed. Once the vehicle was started, each of the subsequent steps was performed ten times, on each wheel, and recorded each time for the ten trials of each wheel indicated in FIG. 4A.

From the test data of ten trials shown in FIG. 4A, with the accompanying graphical representation of the test data shown in FIG. 4B, it is possible to detect amounts as low as 0.2 cc of fluid leak with the device of the present invention. On no brake is a more than 0.5 cc leak necessary before detection on average. In the table of FIG. 4A, the amount of fluid that drained from each of the left front, right front, left rear, and right rear wheels is shown in drops and cc's before detection. The leakage occurring before detection is shown for each of the four wheels, in ten trials in the table of FIG. 4A. From the test data, it appears that the closer the leak is to the master cylinder, the better the detection.

In FIG. 4B, the left front wheel is indicated as 60, the right front wheel is indicated as 62, the left rear wheel is indicated as 64 and the right rear wheel is indicated as 66. The results of the test trials shows that detection of brake fluid leakage is detected in an amount as low as 0.2 cc, and not greater than 0.5 cc on average. The result of the testing proves that the brake leak detector will indicate if a vehicle leaks between 0 to 3 drops of brake fluid (0 to 1.0 cc) out of the system.

Circuit box 28 houses brake leak detector circuitry which is used to produce an indication of "pass" or "fail" for brake fluid in a vehicle. In the embodiment illustrated in FIGS. 1 and 2, an output light 32 is green to indicate an acceptable brake fluid system, and red to indicate an unacceptable brake fluid system, i.e., a fluid leak. An audible signal, such as buzzer 34, can also be incorporated to give additional indication of failure mode.

Figure 3:
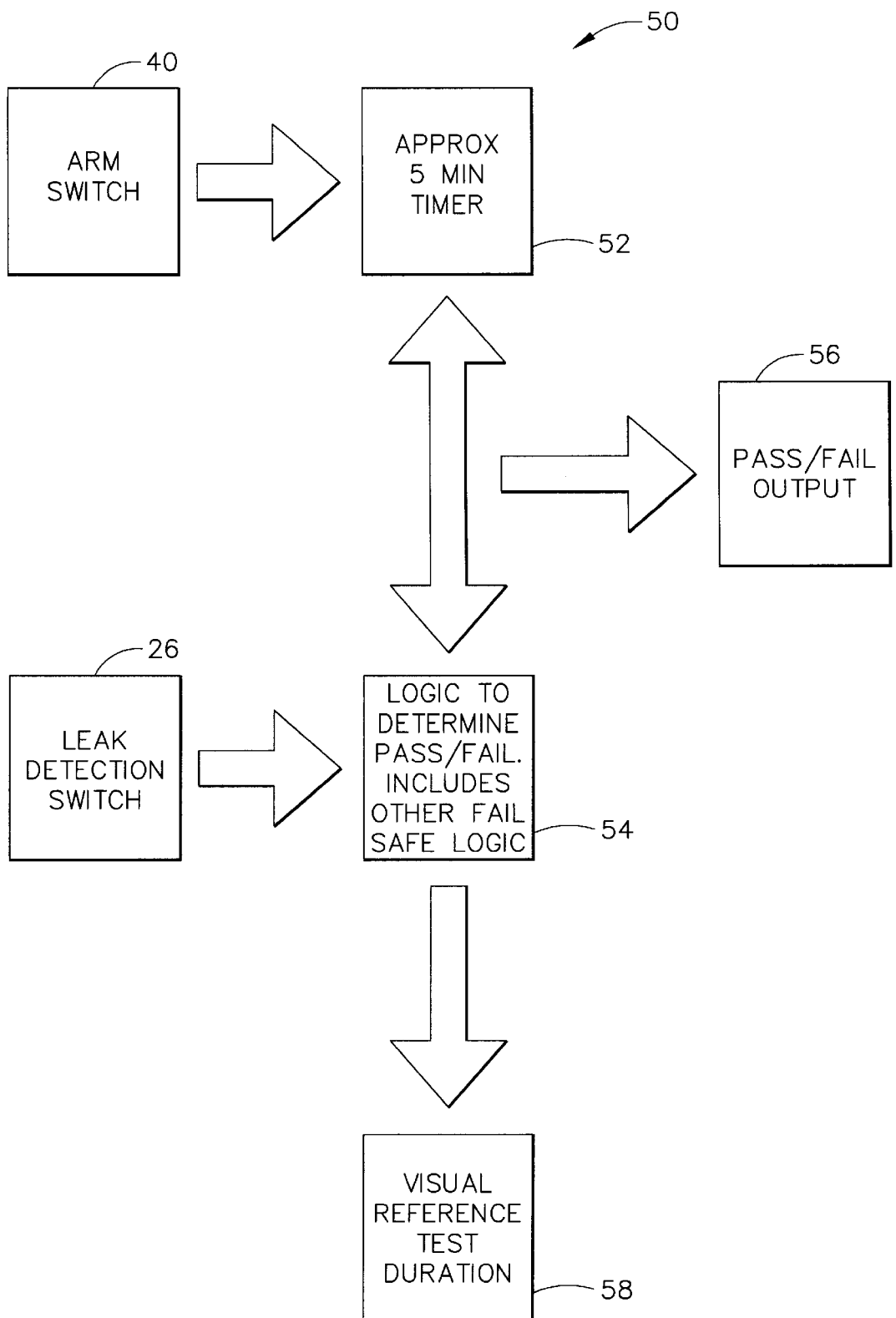
FIG. 3 is a block diagram of the brake leak detector circuit for controlling the vehicle brake leakage testing system of FIGS. 1 and 2, and providing vehicle brake leakage indication.

Referring now to FIG. 3, it will be obvious to those skilled in the art that the objective of the circuitry, to produce an indication of pass or fail for brake fluid, can be accomplished by a variety of suitable means and methods, such as, for example, an oscillator system. When the test is initiated, the circuit of box 28, as detailed in circuit block diagram 50 specifies that timing means 52, such as an oscillator, runs for a period of 1 minute and 5 seconds, at a minimum. This slow 1 minute pulse train goes into logic block 54, which comprises a serial to parallel converter having two functions. First, the converter is used as a counter until 5 pulse trains pass, which approximately represents 5 minutes and 30 seconds. This also signifies the end of the test when the vehicle passes (i.e., when no brake fluid leak is detected), outputting the result at block 56, typically in the form of a green output light 32 or buzzer 34. Secondly, using a serial-to-parallel converter also gives five outputs, shown as five timing lights 10, representing each minute of time.

When a failure is detected, this is indicated by suitable means, such as a blocking transistor for blocking the timing clock pulse. This stops the timer and ensures the failed output stays activated. Since these five light outputs 36 can change incorrectly when failure occurs, a D-FF can be inserted as a timing light memory to help buffer switch spikes produced at the blocking transistor for the serial-to-parallel converter. This helps to prevent premature activation of the subsequent light, in light series 36, when a failure occurs.

In this embodiment, the logic 58 of the circuit 50 uses two external inputs and one internal input. The two external inputs to logic are the leak detection sensor 26 and toggle switch 40, as seen in FIG. 3. The internal input is the output of the serial-to-parallel converter after the 5 minute interval. This goes through a series of AND and INVERTER gates in block 54 to stop the timer 52 and keep the timing lights activated when failure occurs. The opposite is also true when a pass occurs, that is, a transistor of block 54 can be activated to block the detector switch 62 in case a detected failure happens after the 5 minutes is complete. The visual reference of the test duration is indicated at block 58.

Once assembly 10 is securely and properly positioned between the brake pedal 14 and the steering wheel 16, the vehicle is shut off, the ignition turned to accessory, and the steering wheel locked into the proper tilt position. The detector assembly 10 is plugged into the vehicle's 12-volt power outlet, using connection means 38. At this point, the sliding collar 22 is allowed to touch sensor 26, with the contact confirmed by contact indicator 30. The set screw 20 should now be tightened, to maintain the sliding collar in the desired position.

To initiate testing of the brake fluid condition, "test start" switch 40 is engaged, at which point the first of the series of lights 36 should turn on. If no leaks are detected, the second light 36 will come on after approximately 2 to 2½ minutes; the third light 36 will come on after approximately 3 to 3½ minutes; the fourth light 36 will come on after approximately 4 to 4½ minutes; the fifth light 36 will come on after approximately 5 to 5½ minutes; and the output light 32 will be green. Conversely, if a leak is detected, even a leak as seemingly insignificant as a single drop of fluid, audible indicator 34 will sound, output light 32 will be red, the lights 36 will stop illuminating, and contact indicator 30 will be off.

In this manner, brake fluid condition for a vehicle can be quickly and accurately tested for.

Hence, spring 42 operates on collar 22 when the set screw 20 is loose, positioning the face of collar 22 against sensor 26. When collar 22 is locked into position, spring 42 is inoperable. Then, spring 44 acts on rod element 45 against the brake pedal 14, which brake pedal 14 resists (when there is no leak), leaving collar 22 in contact with sensor 26; or which brake pedal 14 allows, depressing pedal 14 and moving collar 22 out of contact with sensor 26 (when there is a leak).

Having described the invention in detail and by reference to the preferred embodiment thereof, it will be apparent that other modifications and variations are possible without departing from the scope of the invention defined in the appended claims.

What is claimed is:

1. A vehicle brake leakage detector apparatus for detecting a fluid leak associated with a vehicle brake system, the vehicle brake system having an associated vehicle brake pedal, the apparatus comprising:

a brake contact for contacting the vehicle brake pedal;

a reference end located at any tangible reference location;

a means for applying force for pressurizing brake fluid when the brake contact depresses the brake pedal and the reference end is located at the tangible reference location;

a sensor means for measuring relative motion between the brake contact and the reference end thereby detecting any brake fluid leaks; and an output means for indicating whether any brake fluid leaks are detected.

2. An apparatus as claimed in claim 1 wherein the reference location comprises a vehicle steering wheel.

3. An apparatus as claimed in claim 1 wherein the output means comprises a visible signal.

4. An apparatus as claimed in claim 3 wherein the visible signal comprises a series of visible signals.

5. An apparatus as claimed in claim 1 wherein the output means comprises an audible signal.

6. An apparatus as claimed in claim 1 wherein the sensor means is a circuit means.

7. A method for detecting fluid leaks in a vehicle brake system having an associated-vehicle brake pedal, the method comprising the steps of:

positioning a brake pedal contact of a detector element on the vehicle brake pedal;

wedging an opposite end of the detector element against a reference means that is positioned at a reference end;

depressing the vehicle brake pedal, while maintaining contact between the brake pedal contact and the brake pedal, thereby "pressurizing the brake fluid;"

sensing relative motion between the brake contact and the reference end thereby detecting a brake fluid leak; and outputting a signal indicative of whether a brake fluid leak exists.

8. A method as claimed in claim 7 further comprising the step of providing a sliding collar between the brake pedal contact and the opposite end of the detector element.

9. A method as claimed in claim 8 further comprising the step of abutting the sliding collar against a brake leak detector circuitry element.

10. A method as claimed in claim 7 further comprising the step of powering the brake leak detector circuitry element with a vehicle 12-volt power outlet.

11. A method as claimed in claim 7 wherein the step of outputting a signal comprises the step of outputting a visible signal.

12. A method as claimed in claim 11 wherein the visible signal comprises a series of visible signals.

13. A method as claimed in claim 7 wherein the step of outputting a signal comprises the step of outputting an audible signal.

* * * * *